US011080942B2

(12) United States Patent
Felix et al.

(10) Patent No.: US 11,080,942 B2
(45) Date of Patent: Aug. 3, 2021

(54) ASSISTANCE METHOD FOR ASSISTING PERFORMANCE OF A TASK ON A PRODUCT, COMPRISING DISPLAYING A HIGHLIGHTING IMAGE HIGHLIGHTING A MONITORED PART OF THE PRODUCT

(71) Applicant: VOLVO TRUCK CORPORATION, Gothenburg (SE)

(72) Inventors: Bertrand Felix, Simandres (FR); Frédéric Rabellino, Heyrieux (FR); Geoffrey Blanc, Villeurbanne (FR); Umen Samreth, Villeurbanne (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/766,221

(22) PCT Filed: Nov. 21, 2017

(86) PCT No.: PCT/IB2017/001635
§ 371 (c)(1),
(2) Date: May 21, 2020

(87) PCT Pub. No.: WO2019/102245
PCT Pub. Date: May 31, 2019

(65) Prior Publication Data
US 2020/0372722 A1    Nov. 26, 2020

(51) Int. Cl.
*G06T 19/20* (2011.01)
*G06T 19/00* (2011.01)
(Continued)

(52) U.S. Cl.
CPC .......... *G06T 19/20* (2013.01); *G02B 27/0101* (2013.01); *G02B 27/0172* (2013.01);
(Continued)

(58) Field of Classification Search
None
See application file for complete search history.

(56) References Cited

U.S. PATENT DOCUMENTS

| 8,878,750 | B1 * | 11/2014 | Park | G02B 27/017 345/8 |
| 2002/0191002 | A1 * | 12/2002 | Friedrich | G05B 19/41875 345/632 |

(Continued)

FOREIGN PATENT DOCUMENTS

| EP | 2876484 A1 | 5/2015 |
| WO | 0135178 A1 | 5/2001 |
| WO | 2016014877 A1 | 1/2016 |

OTHER PUBLICATIONS

International Search Report and Written Opinion dated Jul. 12, 2018 in corresponding International PCT Application No. PCT/IB2017/001635, 10 pages.

*Primary Examiner* — Tapas Mazumder
(74) *Attorney, Agent, or Firm* — Venable LLP; Jeffri A. Kaminski

(57) ABSTRACT

This assistance method is intended for assisting an operator in performing a task on a product (12). To that end, the method comprises a step of displaying, superimposed on a view of a scene including a monitored part of the product (12) on which a subtask of the task has to be performed, at least one assistance image (100, 136) intended to assist the operator in performing this subtask. Said at least one assistance image (100, 136) includes at least one highlighting image (100, 102) highlighting the monitored part.

25 Claims, 6 Drawing Sheets

Figure 1:
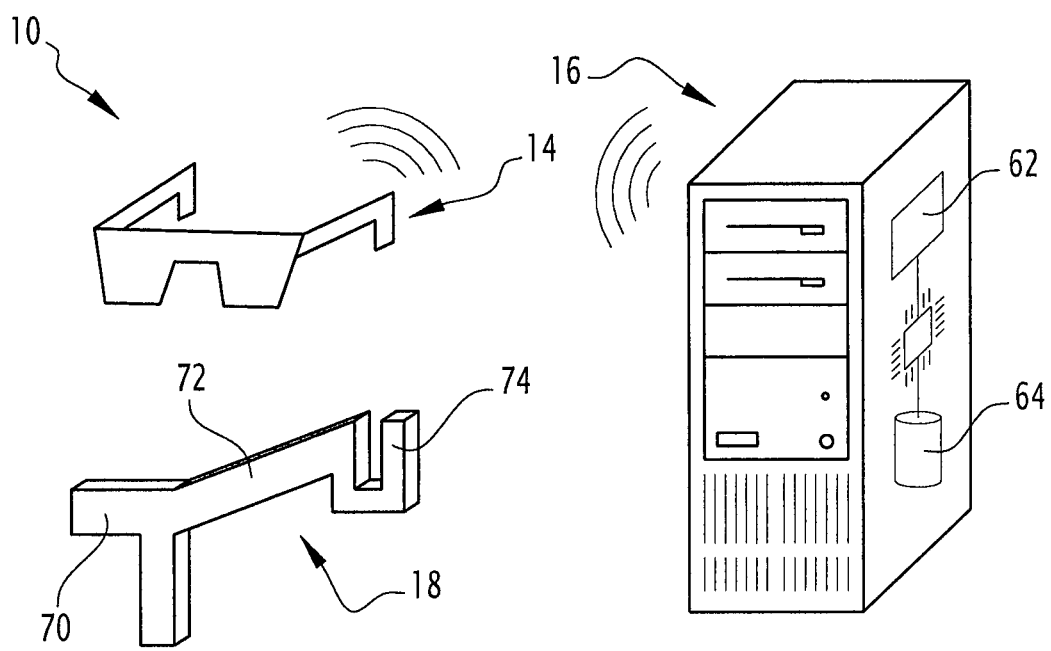

(51) Int. Cl.
*G02B 27/01* (2006.01)
*G06K 7/14* (2006.01)
(52) U.S. Cl.
CPC .......... *G06K 7/1447* (2013.01); *G06T 19/006* (2013.01); *G02B 2027/0134* (2013.01); *G06T 2219/004* (2013.01)

(56) References Cited

U.S. PATENT DOCUMENTS

| | | | | |
|---|---|---|---|---|
| 2015/0146007 A1* | 5/2015 | Dusik | ................. | G06K 9/6202 348/161 |
| 2016/0027212 A1* | 1/2016 | Da Veiga | ............. | H04N 13/344 345/633 |

* cited by examiner

ASSISTANCE METHOD FOR ASSISTING PERFORMANCE OF A TASK ON A PRODUCT, COMPRISING DISPLAYING A HIGHLIGHTING IMAGE HIGHLIGHTING A MONITORED PART OF THE PRODUCT

CROSS-REFERENCE TO RELATED APPLICATIONS

This application is a U.S. National Stage application of PCT/IB2017/001635, filed Nov. 21, 2017, which published on May 31, 2019 as WO 2019/102245 A1, all of which is hereby incorporated by reference in its entirety.

The present invention concerns an assistance method for assisting an operator in performing a task on a product, of the type comprising a step of displaying, superimposed on a view of a scene including a monitored part of the product on which a subtask of the task has to be performed, at least one assistance image intended to assist the operator in performing this subtask.

The present invention also concerns an assistance system for assisting an operator in performing a task on a product, the assistance system comprising a display management unit configured for displaying, superimposed on a view of a scene including a monitored part of the product on which a subtask of the task has to be performed, at least one assistance image intended to assist the operator in performing this subtask.

It is common that, after a product has been produced, said product has to undergo a quality control to ensure that the product meets some set specifications prior to further operations are performed on the product or before the product is sent to a client. Such a quality control exists, for instance, for controlling the quality of automotive vehicle engines.

Usually, such a quality control is executed by a human operator who is required to perform a list of controls on the product, each control consisting of verifying that a part of the product meets some corresponding criteria, and to report a defect in case at least one of the controlled parts does not meet the corresponding criteria. When the product belongs to a range of products including several variants, the list of controls depends habitually on the variant to which the product corresponds.

Generally, the list of controls is provided as a paper printed form that summarizes each control in a few words, and the operator writes the results of his controls on said form. This has several drawbacks:

- this form is not intuitive and requires the operator to have a lot of complementary knowledge to be able to perform the controls correctly, so that a large amount of training hours is needed for an already skilled assembly operator to be trained;
- the operator has the tendency to rely too much on his memory and skills and, as his cognitive load is high, this leads to a risk that he does not perform the control correctly and lets some errors and defect pass the controls;
- there is a risk that the operator misses certain control lines, thus resulting in the operator not controlling some defective parts and letting some errors and defect pass the controls; and
- the results of the controls need to entered in a digital form on the day after by other operators, which leads to time loss because of this necessary double data entry and delays detection of a defective production station.

In response to these issues, there has been proposed a first solution consisting of using buttons as quality control reporting means. However, this first solution does not help the operator to know how he must operate his controls depending on the variant to which the product corresponds, so that the cognitive load remains high for the operator, lots of complementary knowledge is still needed for this operator, and the risk of errors remains high.

There has also been proposed a second solution using augmented reality, wherein information is displayed on a display surface superimposed on a view of scene including the controlled product. However, in this second solution, positioning of the information on the display surface is independent from the position of the controlled product in the view of the scene; and this information does not allow the operator to know where he should put his attention on the product to perform each control. As a result therefrom, the cognitive load remains high for the operator, lots of complementary knowledge is still needed for this operator, and the risk of errors remains high.

An objective of the invention consists of assisting an operator in performing a task on a product, so as to reduce the risk of errors from the operator while performing the task. Specific objectives of the invention consist in reducing the cognitive load of the operator while performing the task, reduce the needed knowledge for the operator to be able to complete the task, and prevent the operator from missing some subtasks while executing the task. Another objective consists of facilitating report of the accomplishment of the task by the operator.

To that end, the invention relates to an assistance method of the type mentioned above, wherein the at least one assistance image includes at least one highlighting image highlighting the monitored part.

According to specific embodiments of the invention, the assistance method also comprises one or more of the following features, considered alone or according to any technically possible combination(s):

- the at least one highlighting image comprises a ring surrounding the monitored part and preferably centered on said monitored part, and/or a virtual representation of said monitored part, said virtual representation being positioned so as to substantially match the monitored part in the view of the scene,
- the at least one assistance image is displayed on at least one display surface,
- the view of the scene consists of a view of the scene through the at least one display surface,
- the at least one display surface is part of a head-mounted display device, said head-mounted display device being adapted to be worn by the operator in such a manner that the or each display surface faces a respective one of his eyes,
- the at least one display surface includes a primary display surface and a secondary display surface, the at least one assistance image consisting of a stereoscopic image including a primary image displayed on the primary display surface and a secondary image displayed on the secondary display surface, said primary and secondary images consisting of images of a same element viewed from slightly different angles,
- the view of the scene is provided by a view source, and the method further comprises the following steps:
  tracking a displacement of the view source from a first viewing position in the scene, in which the product occupies a first relative position with a first relative orientation relatively to the view source, toward a second viewing position in which the product occupies a second relative position with a second relative orientation relatively to the view source,
calculating an estimation of the second relative position and of the second relative orientation from the first relative position and orientation and from the tracked displacement, and
refreshing the display of the at least one assistance image so as to adjust said at least one assistance image to the estimation of the second relative position and orientation,
the view source comprises the position intended to be occupied by at least one of the eyes of the operator wearing the head-mounted display device,
the first viewing position consists of an initial viewing position in which the first relative position and orientation consist of predetermined relative position and orientation known by a display management unit in charge of displaying the at least one assistance image,
the assistance method comprises a step of equipping the product with a support comprising a slot able for receiving the view source and adapted so that, when the support is equipped on the product and the view source is received in said slot, the view source is placed in said initial viewing position, followed by a step of placing the view source in the slot of said support,
the at least one assistance image comprises at least one guidance image highlighting an area where to place the view source so as to provide a better view on the monitored part,
the assistance method comprises a step of displacing the view source in the scene in manner that the distance of the view source from the monitored part crosses a threshold distance, followed by a step of modifying the position of at least part of the at least one assistance image,
the task to be performed comprises, and in particular consists of, a quality control of the product,
the product comprises, and in particular consists of, a part of an automotive vehicle, such as an engine of an automotive vehicle,
the assistance method comprises, prior to displaying the at least one assistance image, a step of automatically reading an identification code associated to the product, followed by a step of, using said identification code, automatically retrieving a list of at least one subtask to be performed on the product, the at least one assistance image being intended to assist the operator in performing a subtask of said list.

The invention also relates to an assistance system of the type mentioned above, wherein the at least one assistance image includes at least one highlighting image highlighting the monitored part.

According to specific embodiments of the invention, the assistance system also comprises one or more of the following features, considered alone or according to any technically possible combination(s):

the at least one highlighting image comprises a ring surrounding the monitored part and preferably centered on said monitored part, and/or a virtual representation of said monitored part, said virtual representation being positioned so as to substantially match the monitored part in the view of the scene;
the assistance system comprises at least one display surface, the display management unit being configured to display the at least one assistance image on said at least one display surface;
the view of the scene consists of a view of the scene through the at least one display surface;
the assistance system comprises a head-mounted display device which includes the at least one display surface, said head-mounted display device being adapted to be worn by the operator in such a manner that the or each display surface faces a respective one of his eyes;
the at least one display surface comprises a primary display surface and a secondary display surface, and the display management unit is configured for displaying a primary image on the primary display surface and a secondary image on the secondary display surface, said primary and secondary images consisting of images of a same element viewed from slightly different angles, so as to form the at least one assistance image as a stereoscopic image resulting from the combination, by the eyes of the operator, of the primary and secondary images;
the assistance system includes a view source, at least one sensor to track a displacement of the view source from a first viewing position in the scene, in which the product occupies a first relative position and a first relative orientation relatively to the view source, toward a second viewing position in which the product occupies a second relative position and a second orientation relatively to the view source, and the display management unit is configured to calculate an estimation of the second relative position and orientation from the first relative position and orientation and from the tracked displacement, and to refresh the display of the at least one assistance image so as to adjust said at least one assistance image to the estimation of the second relative position and orientation;
the view source comprises the position intended to be occupied by at least one of the eyes of the operator wearing the head-mounted display device;
the assistance system comprises a support able to be mounted on the product and including a slot able for receiving the view source, said support being adapted so that, when it is mounted on the product and the view source is received in said slot, the view source is placed in the initial viewing position;
the first viewing position consists of an initial viewing position in which the first relative position and orientation consist of predetermined relative position and orientation known by the display management unit;
the at least one assistance image comprises at least one guidance image highlighting an area where to place the view source so as to provide a better view on the monitored part;
the display management unit is configured for modifying the position of at least part of the at least one assistance image when the distance of the view source from the monitored part crosses a threshold distance;
the task to be performed comprises, and in particular consists of, a quality control of the product;
the product comprises, and in particular consists of, a part of an automotive vehicle, such as an engine of an automotive vehicle;
the system comprises a memory storing a virtual mockup of the product;
the system comprises a memory storing a list of at least one subtask to be performed, a reader able to read an identification code worn by the product, and a configuration unit configured to retrieve said list in the memory, using the identification code read by the reader, and the display management unit being configured to display the at least one assistance image depending on the relevant list retrieved from the memory.

Figure 3:
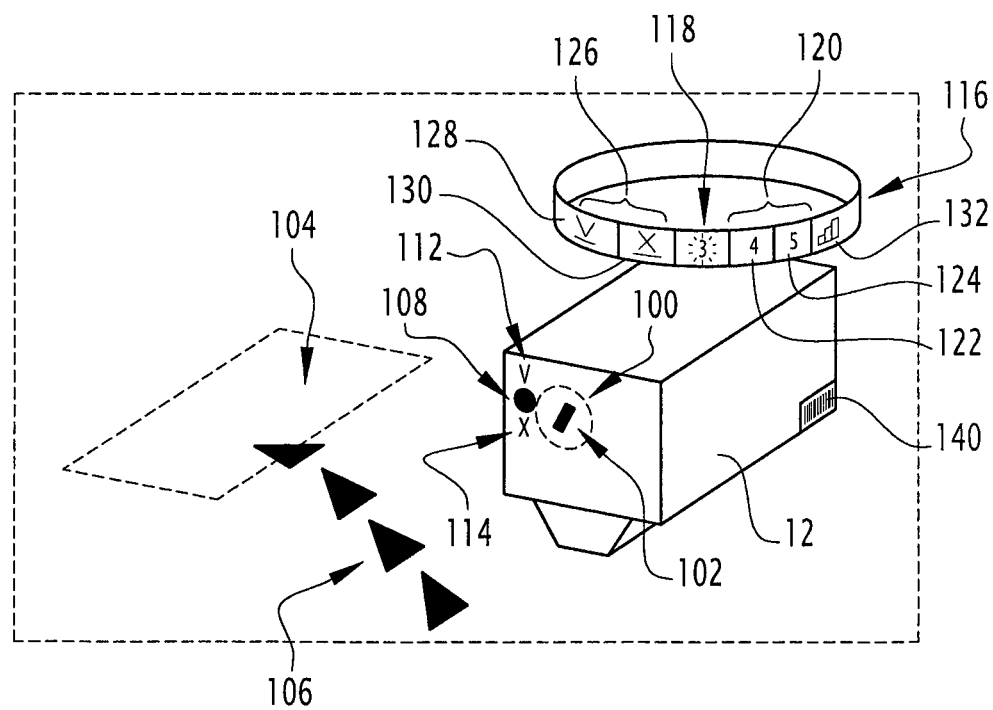
Figure 2:
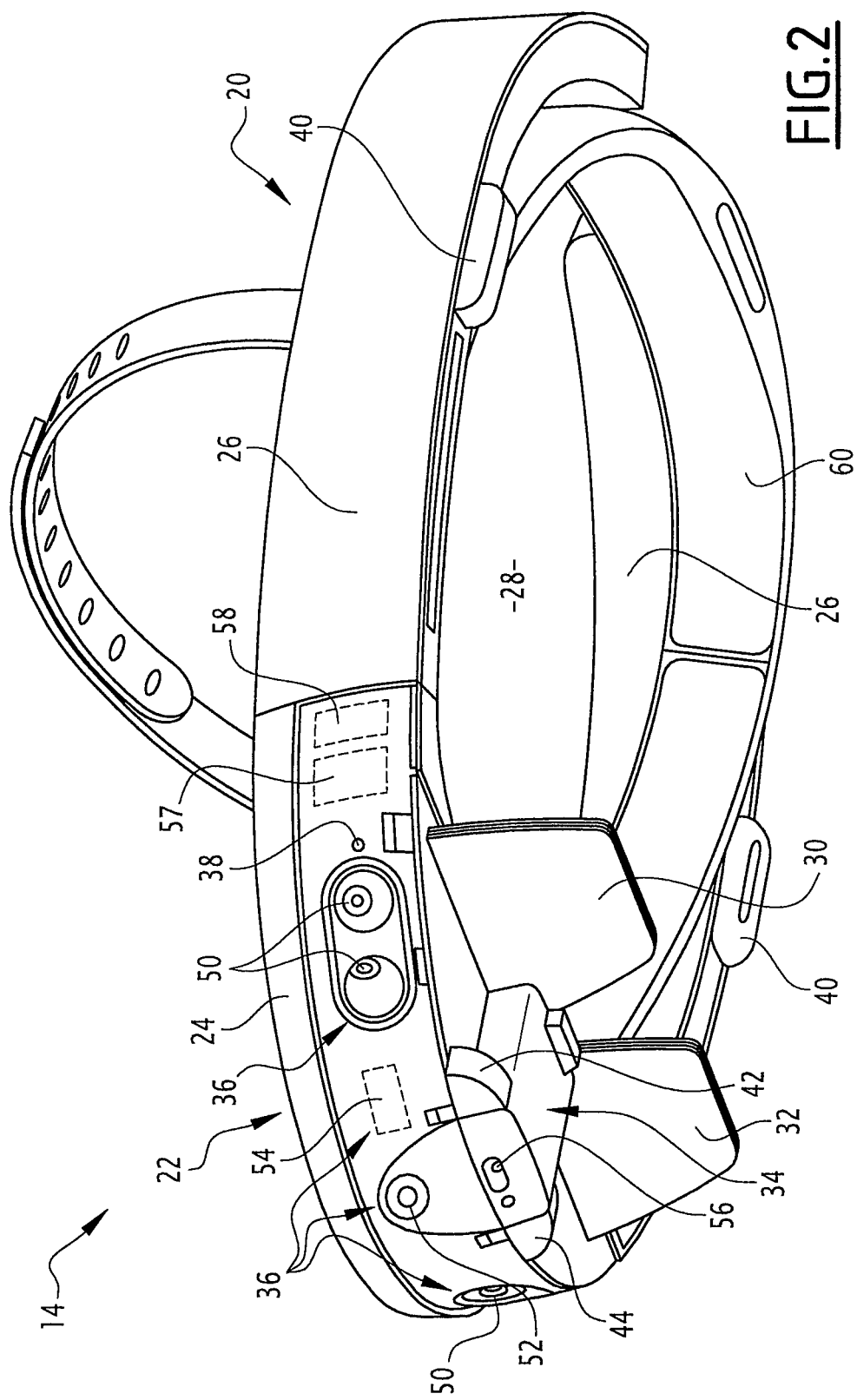
Figure 4:
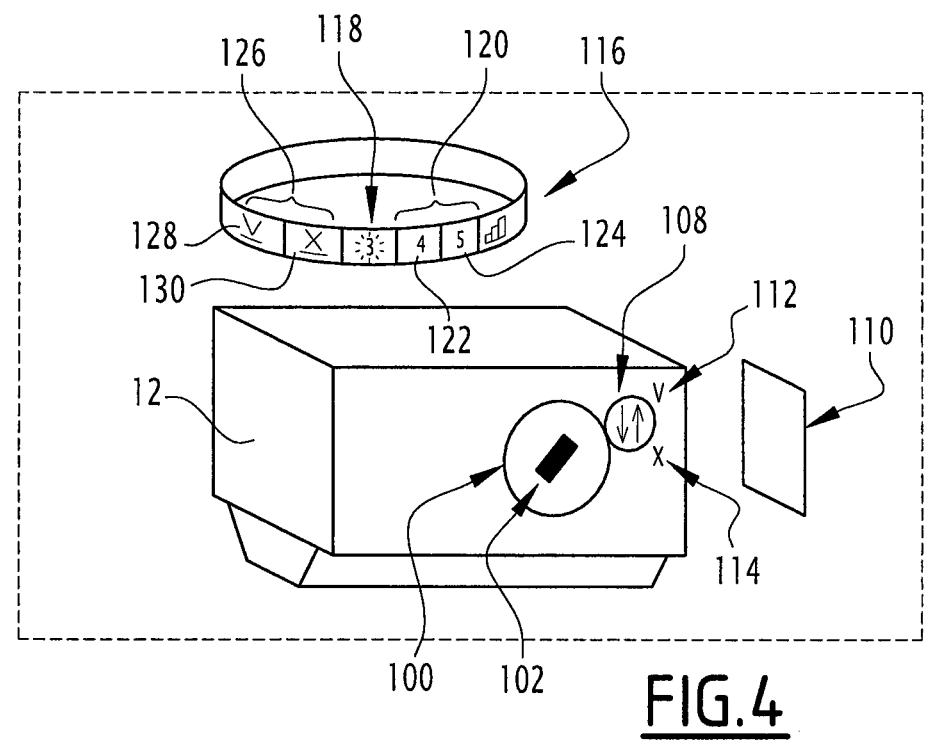
Figure 5:
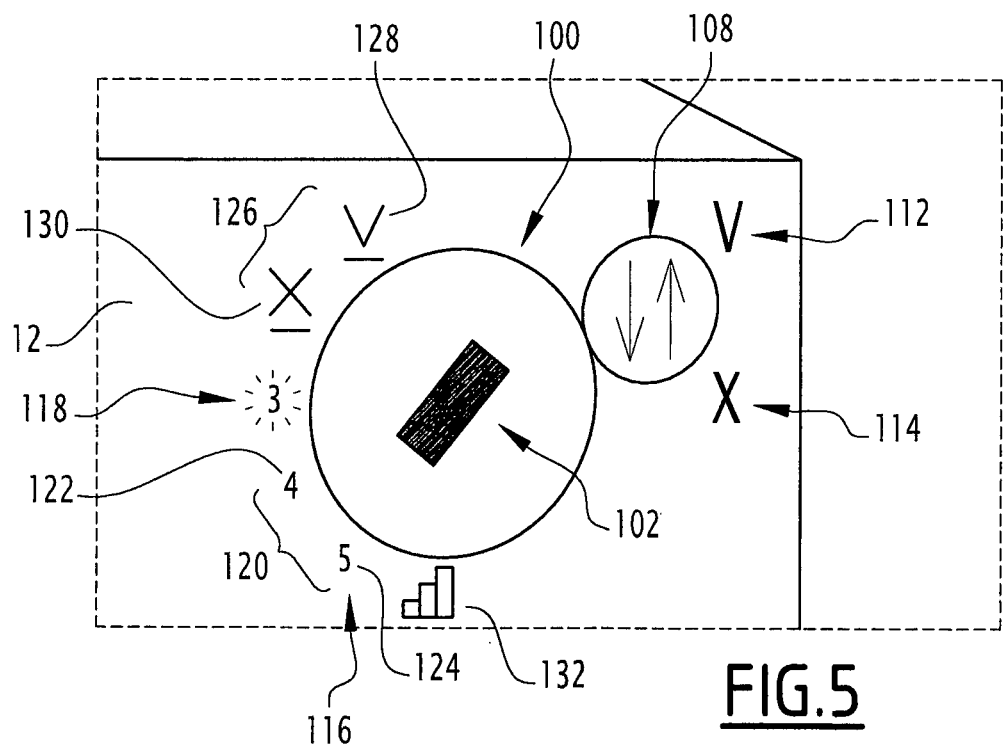
Figure 6:
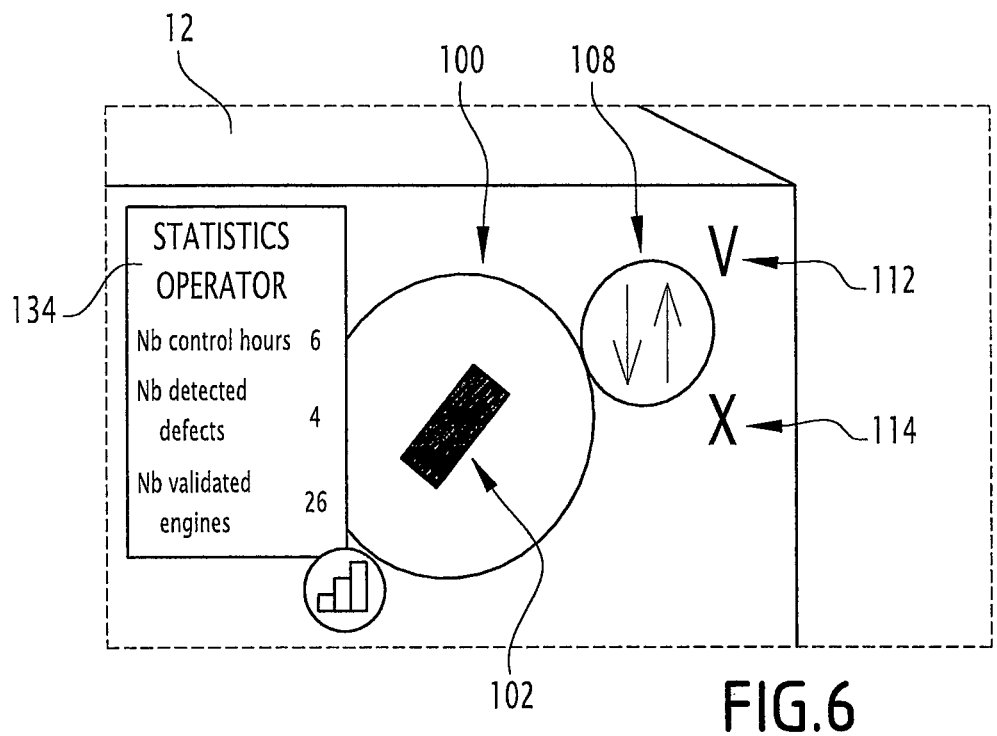
Figure 7:
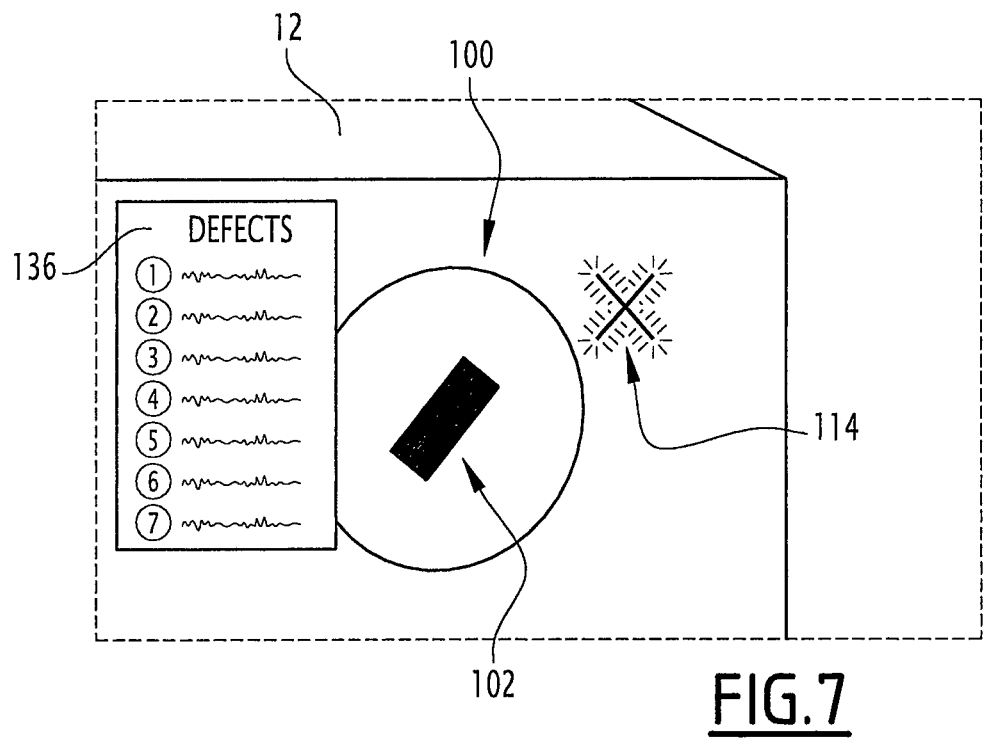
Figure 8:
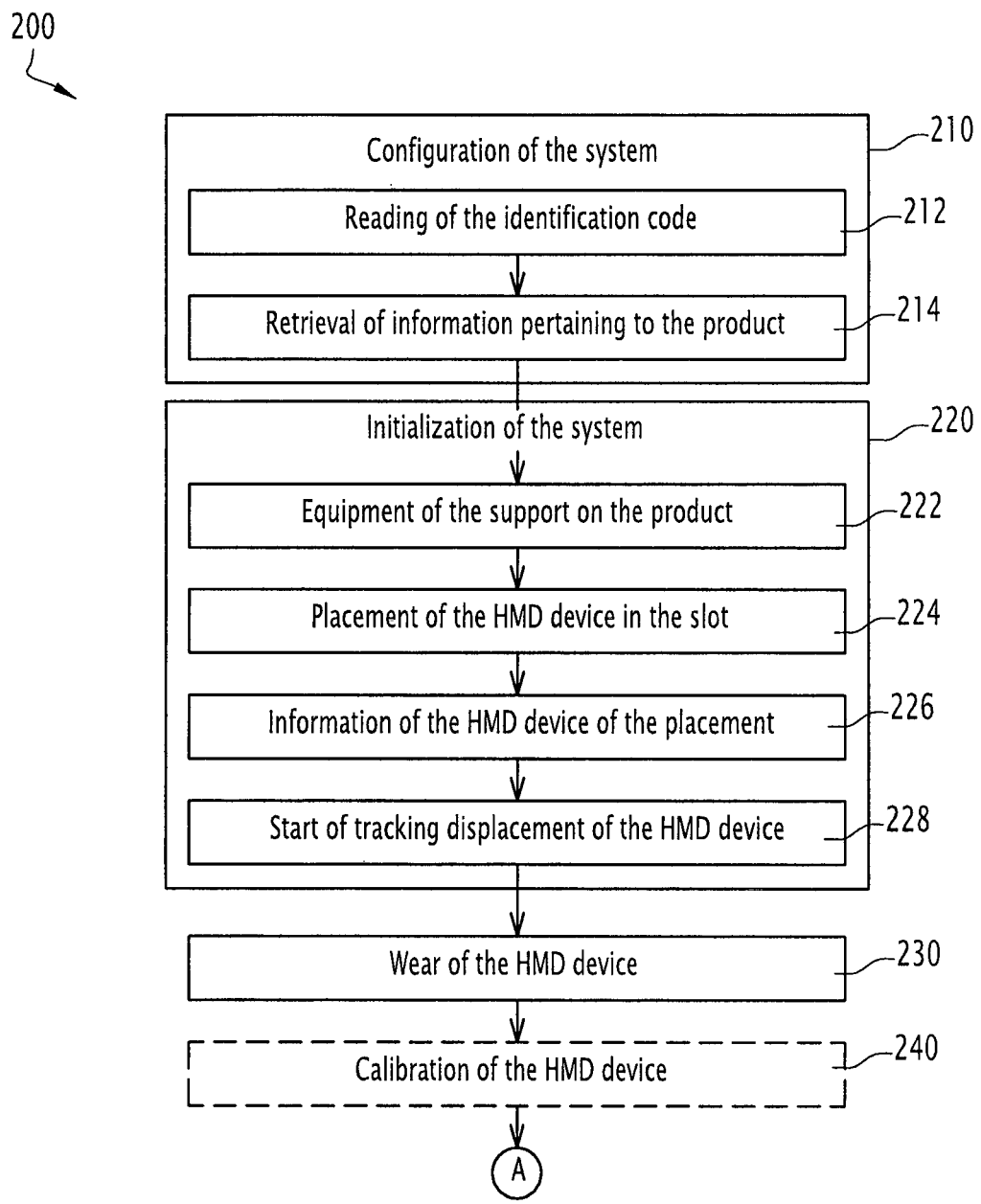
Figure 9:
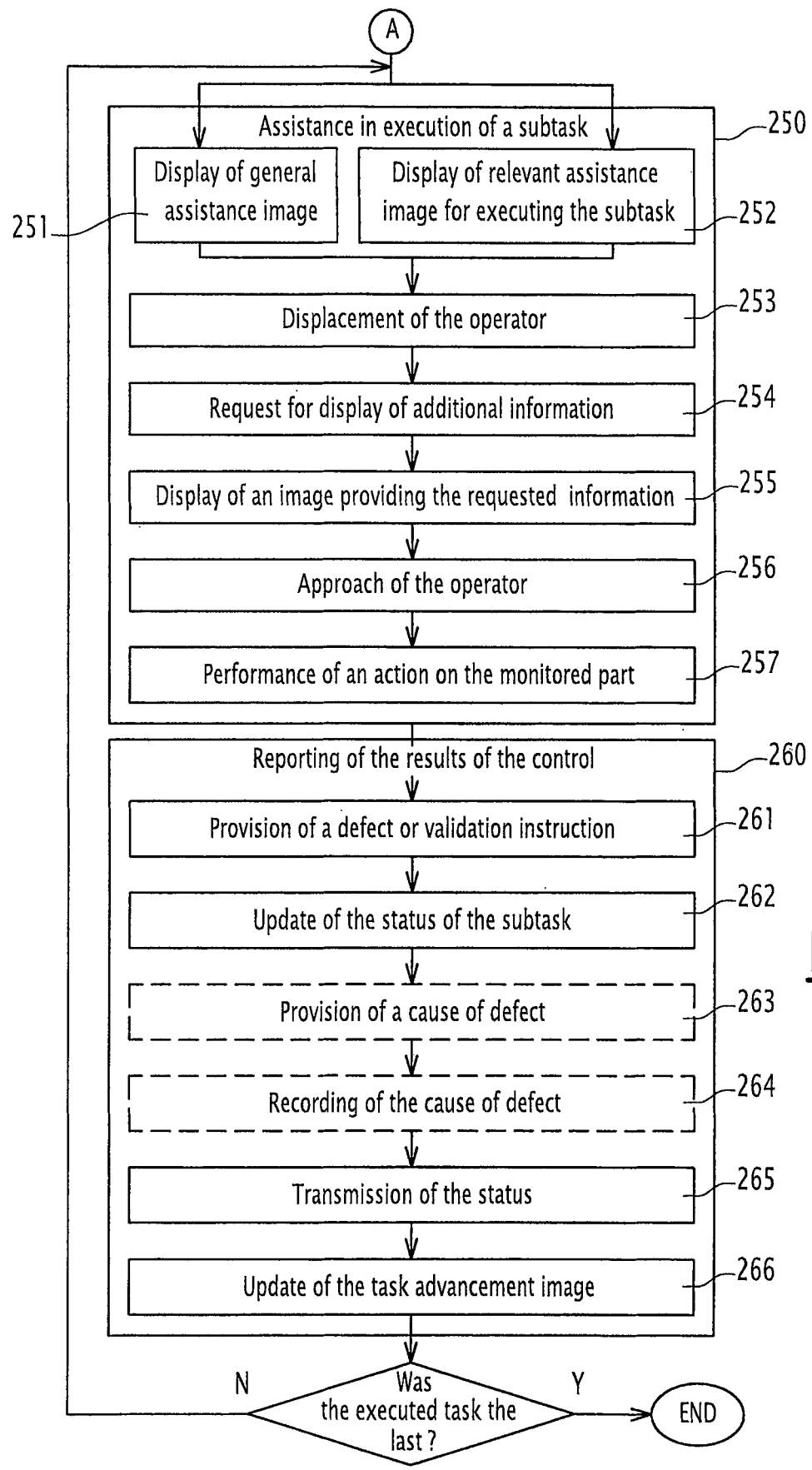

Other features and advantages of the invention will appear upon reading the following description, provided solely as an example and done in reference to the appended drawings, in which:

FIG. 1 is a schematic view of an assistance system according to the invention,

FIG. 2 is a perspective view of a head-mounted display device of the assistance system of FIG. 1, FIG. 3 is an exemplary view of a first display provided by the assistance system of FIG. 1, superimposed on a first view of a scene including the product on which the task has to be performed, FIG. 4 is an exemplary view of a second display provided by the assistance system of FIG. 1, superimposed on a second view of the scene, FIG. 5 is an exemplary view of a third display provided by the assistance system of FIG. 1, superimposed on a third view of the scene, FIG. 6 is an exemplary view of a fourth display provided by the assistance system of FIG. 1, superimposed on the third view of the scene, FIG. 7 is an exemplary view of a fifth display provided by the assistance system of FIG. 1, superimposed on the third view of the scene, FIG. 8 is a block diagram of a first part of an assistance method according to the invention, implemented with the assistance system of FIG. 1, and FIG. 9 is a block diagram of a second part of the assistance method of FIG. 8.

The assistance system 10 shown in FIG. 1 is intended to assist an operator in performing in task on a product 12 (see FIG. 3). The task to be performed consists in particular of quality control of the product 12, the product consisting typically of an engine of an automotive vehicle such as a truck (not shown).

To that end, the assistance system 10 comprises a front-end display device 14, a back-end server 16, and a support 18.

With reference to FIG. 2, the front-end display device 14 consists of a head-mounted display device (referred to as "HMD device" in FIGS. 8 and 9) comprising a frame 20 adapted to be mounted on the head of a user, and an interactive device 22 configured for interacting with a user having the frame 20 positioned on his head.

The frame 20 comprises a front beam 24 and two arms 26 projecting from the front beam 24 toward a rear end of the head-mounted display device 14, the front beam 24 and the arms 26 encircling together a free area 28 intended for reception of the head of the user.

The interactive device 22 comprises a primary display surface 30, a secondary display surface 32, a display management unit 34 to display images on the display surfaces 30, 32, a displacement tracking unit 36 to track displacement of the head mounted device 14 relatively to a reference position and a reference orientation thereof, at least one microphone 38 to input speech from the user, and at least one audio speaker 40 to output sound to the user.

The primary and secondary display surfaces 30, 32 are placed on the front beam 24 in such a manner that, when the head-mounted display device 14 is worn by a user, the primary display surface 30 faces a first eye of the user and the secondary display surface 32 faces the second eye of the user.

Each one of these display surfaces 30, 32 is transparent, so that the user wearing the head-mounted display device 14 can see a view of a scene through said display surface 30, 32. The positions (not shown) intended to be occupied by the eyes of the user wearing the head-mounted display device 14 thus form a view source from which a view of a scene is provided.

The display management unit 34 comprises means 42, 44 to display images on the display surfaces 30, 32, without hindering sight of the user through the display surfaces 30, 32. These means 42, 44 typically consist of a primary projector 42 to project the displayed images on the primary display surface 30, and of a secondary projector 44 to project the displayed images on the secondary display surface 32.

The display management unit 34 furthermore comprises a circuitry (not shown) to pilot the projectors 42, 44 and calculate the images to be displayed on the display surfaces 30, 32. This circuitry is preferably housed in the front beam 24 and includes, for example, at least one processor and at least one memory.

In particular, the circuitry is configured for piloting the primary projector 42 so that said primary projector 42 displays a primary image on the primary display surface 30 and for piloting the secondary projector 44 so that said secondary projector 44 displays a secondary image on the secondary display surface 32, said primary and secondary images consisting of images of a same element viewed from slightly different angles and adapted so as to form at least one stereoscopic image resulting from the combination, by the eyes of the user, of the primary and secondary images.

The display management unit 34 is configurable so as to have knowledge of the positions occupied by the eyes of a user wearing the head-mounted display device 14, relatively to the display surfaces 30, 32. In other words, the display management unit 34 is configurable so as to have knowledge of the position of the view source relatively to the head-mounted display device. This allows the display management unit 34 to place properly the at least one stereoscopic image in the view of the scene.

The displacement tracking unit 36 comprises a plurality of positioning and orientation sensors 50, 52, 54 to track displacement of the head-mounted display device 14.

These sensors 50, 52, 54 are preferably housed in the front beam 24, as shown here. They include at least one visible-spectrum tracking camera 50 for use in capturing images of surrounding surfaces (said cameras 50 being, in the provided example, in the number of four, two of which being positioned on a left side of the front beam 24, the two others being positioned on the right side of the front beam 24), at least one infrared spectrum depth camera 52 for use in determining distances to nearby surfaces (e.g., for use in surface reconstruction to model the user's environment), coupled to an infrared illumination source (not shown), and an inertial measurement unit 54 to measure accelerations and rotations of the head-mounted display device 14.

The displacement tracking unit 36 further comprises a calculator (not shown) to receive the data collected by the sensors 50, 52, 54, deduce therefrom an estimation of the position and of the orientation of the head-mounted display device 14 in real-world space, compare this estimation with a reference position and a reference orientation, and deduce therefrom a displacement of the head-mounted display device 14 relatively to said reference position and reference orientation. This calculator is preferably housed in the front beam 24 and includes, for example, at least one processor and at least one memory.

The displacement tracking unit 36 is configured to provide the calculated estimation to the display management unit 34.

The head-mounted display device 14 further comprises at least one visible-spectrum standard camera 56 for use in capturing standard video of what the user sees. This standard camera 56 is preferably, as shown, housed in the front beam 24.

In addition, the head-mounted display device 14 comprises a data computing unit 57 which is preferably, as shown, housed in the front beam 24. This data computing unit 57 comprises a memory (not shown) and a processor (not shown) associated to said memory, the memory storing at least one software program adapted to be executed by the processor.

The head-mounted display device 14 also comprises a communication unit 58, in particular a wireless communication unit, for communication of the head-mounted display device 14 with the back-end server 16. As shown, this communication unit 58 is preferably housed within the front beam 24.

The head-mounted display device 14 furthermore comprises a headband 60 to improve fitting of the head-mounted display device 14 on the head of the user. This headband 60 is encircled by the frame 20 and surrounds the free space 28.

The head-mounted display device 14 typically consists of a Microsoft® HoloLens® device.

The back-end server 16 comprises a communication module 62, in particular a wireless communication module, for communication of the back-end server 16 with the head-mounted display device 14. To that end, the communication module 62 uses the same communication protocols as the communication unit 58 of the head-mounted display device 14.

The back-end server 16 further comprises a memory 64 storing, associated to an identifier of the product 12:
- a virtual, three-dimensional mockup of said product 12, said virtual mockup consisting preferably of an exact digitalized three-dimensional mockup of the product 12, as created by the department in charge of the development of the product 12, transformed into a light weight format, preferably a format in which the mockup has 100 000 facets or less,
- an initial relative positioning information, said initial relative positioning information consisting typically of a default viewing position and orientation of the virtual mockup, and
- a list of subtasks to be performed on the product 12 for the execution of the task.

Preferably, the memory 64 also stores at least one other mockup, at least one other initial relative positioning information, and at least one other list of subtasks, said other mockup(s), initial relative positioning information and list(s) being associated to other identifiers than the identifier of the product 12.

The support 18 comprises a bracket 70 adapted to be mounted on the product 12 at a predetermined position on said product 12, an arm 72 projecting from said bracket 70, and a slot 74 for receiving the front-end display device 14, the slot 74 being disposed at an end of the arm 72 opposite the end by which the arm 72 is connected to the bracket 70. The support 18 is adapted so that, when it is mounted on the product 12 and the front-end display device 14 is received in the slot 74, then the front-end display device 14 is placed in an initial viewing position relatively to the product 12.

The support 18 is for instance 3D-printed.

According to the invention, the assistance system 10 is configured so that the display management unit 34 may display, superimposed on the view of the scene provided from the view source, at least one assistance image 100, . . . , 136 (FIGS. 3 to 6) intended to assist the operator in performing his task, said at least one assistance image 100, . . . , 136 consisting of a stereoscopic image obtained by the combination of the primary image displayed on the primary display surface 30 and of the secondary image displayed on the secondary display surface 32.

To that end, the head-mounted display device 14 is provided with a code reader and a configuration unit.

The code reader is typically provided in the form of a software program stored in the memory of the data computing unit 57 of the head-mounted display device 14 and adapted to be executed by the processor of said data computing unit 57.

The code reader is configured for receiving an image captured by the standard camera 56, for recognizing in said image an identification code having a predetermined format, and for decoding said identification code into an identifier.

The configuration unit is typically provided in the form of a software program stored in the memory of the data computing unit 57 of the head-mounted display device 14 and adapted to be executed by the processor of said data computing unit 57.

This configuration unit is configured to retrieve in the memory 64 of the server 16, using the identifier decoded by the code reader, the virtual mockup, the initial relative positioning information, and the list of subtasks which are, in said memory 64, associated to said identifier. The configuration unit is further configured to retrieve, for each subtask within said list of subtasks, a part information, an action information and, optionally, at least one of a picture and an animation corresponding to said subtask, and to provide the virtual mockup and the list of subtasks to the display management unit 34 together with said part information, action information, picture and/or animation.

The part information designates the virtual representation, in the virtual mockup, of a monitored part of the product 12 on which the subtask has to be performed.

The action information identifies an action which has to be executed on the monitored part to perform the subtask; for instance, this action consists of one of taking a look at the monitored part and of testing ability of the monitored part to be displaced.

The picture consists typically of a picture showing the monitored part in a state in which said part is in compliance with the quality control requirements.

The animation consists typically of a video showing how the action should be performed.

The display management unit 34 is configured to display the at least one assistance image 100, . . . , 136 depending on the virtual mockup, the part information, the action information, the picture and/or the animation provided to it by the configuration unit.

With reference to FIG. 3, the display management unit 34 is in particular configured to display at least one assistance image 100, 102 consisting of a highlighting image highlighting the monitored part. By "highlighting the monitored part", it is meant that the at least one highlighting image 100, 102 is able to draw the attention of the operator wearing the head-mounted display device 14 on the monitored part. To that end, the at least one highlighting image 100, 102 is positioned in the view of the scene so as to be in a specific relationship with the position of the monitored part in said view; in other words, the at least one highlighting image 100, 102 has a predetermined positioning relative to the monitored part. The at least one highlighting image 100, 102 is for instance centered or superimposed on said monitored part.

These highlighting images 100, 102 are here in the number of two and comprise a ring 100 surrounding the monitored part and in particular centered on said monitored part, and a virtual representation 102 of said monitored part, said virtual representation 102 being positioned so as to substantially match the monitored part in the view of the scene. Alternatively, the at least one assistance image 100, . . . , 136 comprises a single highlighting image 100, 102 consisting of one of the ring 100 and of the virtual representation 102.

The virtual representation 102 consists typically of the virtual representation of the monitored part, extracted by the display unit 34 from the virtual mockup of the product 12 on the basis of the part information provided by the configuration unit.

The display management unit 34 is also configured to display at least one assistance image 104, 106 consisting of a guidance image highlighting an area where to place the view source so as to provide a better view of the monitored part. This at least one guidance image 104, 106 is intended so that the operator may perform the full task by going around the product 12 only once, thus minimizing the overall number of steps of the operator needed for the execution of the task, and therefore reducing the time needed for completing this task.

To that end, these guidance images 104, 106 are here in the number of two and comprise a square 104 superimposed on a region of the floor where the operator should stand to be able to see the monitored part, and a succession of arrows 106 pointing toward said region of the floor. Alternatively, the at least one assistance image 100, 136 comprises a single guidance image 104, 106 consisting of one of the square 104 and of the succession of arrows 106. Alternatively, the succession of arrows 106 is replaced by a single arrow (not shown).

The display management unit 34 is configured to display said at least one guidance image 104, 106 when the monitored part is not visible in the view of the scene.

With reference to FIG. 4, the display management unit 34 is further configured to display at least one assistance image 108, 110 consisting of an action explanation image intended for explaining to the operator the action to be performed.

Here, the action explanation images are in a number of two and comprise a shield 108 wearing a pictogram depicting the action to be executed on the monitored part, and a frame 110 presenting the picture and/or the animation provided by the configuration unit.

The display management unit 34 is configured to display the shield 108 so that it faces a position in the scene where the view on the monitored part is optimal. The pictogram depends on the action information provided by the configuration unit; for instance, the pictogram consists in two opposed right arrows, as shown, when the action consists of testing the ability of the monitored part to be displaced by pushing and pulling said monitored part, in two opposed curved arrows (not shown) when the action consists of testing the ability of the monitored part to be displaced by rotating the monitored part, or in an eye when the action merely consists of taking a look at the monitored part.

The display management unit 34 is configured to position the shield 108 adjacent to the ring 100, preferably in substantially the same plane as said ring 100.

In addition, the display management unit 34 is configured to display assistance images 112, 114 consisting of a validation mark 112 and a defect mark 114, said marks 112, 114 being preferably positioned, as shown, adjacent to the shield 108, in substantially the same plane as said shield 108, the validation mark 112 being typically placed above the shield 108 and the defect mark 114 being typically placed under the shield 108.

Furthermore, the display management unit 34 is configured to display an assistance image 116 consisting of a task advancement image, intended to inform the operator about his advancement in the achievement of the task.

This task advancement image 116 comprises here an ordinal 118 of the subtask which is in the status of being executed by the operator; this ordinal 118 is advantageously, as shown, highlighted. The task advancement image 116 further comprises information 120 about remaining subtasks which are still to be performed before achievement of the task, this information being here provided by the ordinals 122, 124 of said remaining subtasks, said ordinals 122, 124 not being highlighted and being positioned on a first side of the ordinal 118. Advantageously, the task advancement image 116 also comprises information 126 about the status of finished subtasks; this information is advantageously positioned, as shown, on a second side of the ordinal 118 opposite the first side, and is preferably provided, as shown, as a validation mark 128 for the subtasks in which the operator has validated compliance of the controlled part with the quality control requirements, and as a defect mark 130 for the subtasks in which the operator has signaled non-compliance of the controlled part with the quality control requirements, said marks 128, 130 being here arranged in the same order as the order in which these subtasks have been executed.

The display management unit 34 is in particular configured to display the task advancement image 116, when the view source is at a distance of the monitored part above a threshold distance, as a carrousel floating above the product 12, as shown in FIGS. 3 and 4, said carrousel being oriented so that the ordinal 118 faces the view source, and to display the task advancement image 116 as a succession of icons adjacent to the ring 100 and placed substantially in the same plane as said ring 100, as shown in FIG. 5, when the view source is at a distance of the monitored part under said threshold distance. Thus, the display management unit 34 is configured for modifying the position of the task advancement image 116 when the distance of the view source from the monitored part crosses the threshold distance.

Moreover, the display management unit 34 is configured to display an assistance image 132 consisting of a statistics button for access to the statistics of the operator. This statistics button 132 is preferably, as shown, integrated in the carrousel when the view source is at a distance of the product 12 above the threshold distance, and positioned adjacent to the ring 100 when the view source is at a distance of the product 12 under the threshold distance.

Besides, the display management unit 34 is configured to display an assistance image 134 consisting of a statistics menu, as shown in FIG. 6, when a corresponding instruction has been provided by the operator, for instance as a vocal instruction, or as a movement of the hand showing the intention of the operator to tap the statistics button 132.

The display management unit 34 is configured to display the statistics menu 134 as a window superimposed on the view of the scene and showing the number of control hours worked by the operator, the number of detected defects, and the number of validated products.

Additionally, the display management unit 34 is configured to display an assistance image 136 consisting of a defects menu, as shown in FIG. 7, when an instruction has been provided by the operator that the monitored part is defective, for instance as a vocal instruction, or as a movement of the hand showing the intention of the operator to tap the defect mark 114, or as a combination of a vocal instruction and of a specific movement of a hand of the operator.

The display management unit 34 is configured to display the defects menu 136 as a window superimposed on the view of the scene and listing a list of defect causes, including for instance:

a wrong assembly,
a missing part,
a broken part,
an interference or a clash,
a wrong orientation,
a leakage, and
a wrong part.

So as to position the at least one assistance image 100, . . . , 136 properly in the view of the scene, and so as to display the proper assistance images 100, . . . , 136 depending on the position and the orientation of the view source, the display management unit 34 is configured to calculate an estimation of a relative position and orientation of the view source relatively to the product 12, and to adjust the at least one assistance image 100, . . . , 136 depending on the estimation of said relative position and orientation. The display management unit 34 is further configured to update the calculation of the estimated position and orientation at a predetermined frequency, and to refresh the display of the at least one assistance image 100, . . . , 136 at the same frequency so as to continuously adjust said at least one assistance image 100, . . . , 136 to said estimated relative position and orientation. Preferably, this frequency is equal or superior to 60 Hz.

To calculate the estimation of the relative position and orientation of the view source relatively to the product 12, the displacement tracking unit 36 is configured to record the estimation of the position and of the orientation of the head-mounted display device 14 in real-world space as the reference position and the reference orientation, and the display management unit 34 is configured to calculate the estimation of the relative position and orientation from the predetermined relative positioning information provided by the configuration unit and from the calculated displacement provided by the displacement tracking unit 36.

The assistance system 10 is further configured so as to record reporting of the operator on his execution of the task. To that end, the head-mounted display device 14 is provided with a reporting unit.

This reporting unit is typically provided in the form of a software program stored in the memory of the data computing unit 57 of the head-mounted display device 14 and adapted to be executed by the processor of said data computing unit 57.

The reporting unit is configured to record a status of each subtask listed in the list of subtasks retrieved by the configuration unit, this status being either a validated status of a defective status.

The reporting unit is configured to record a validated status upon reception of a validation instruction provided by the operator. This validation instruction comprises preferably an oral instruction and/or a specific displacement of a hand of the operator, for instance a displacement marking the intention of the operator to tap the validation mark 112.

The reporting unit is configured to record a defective status upon reception of a defect report provided by the operator. This defect report comprises preferably an oral instruction and/or a specific displacement of a hand of the operator, for instance a displacement marking the intention of the operator to tap the defect mark 114.

The reporting unit is further configured to record, for each defective status, a cause of defect. This cause of defect is recorded upon reception of an information from the operator designating one designated cause among the defect causes listed by the defects menu 136, this information being for instance in the form of an oral phrase and/or of a specific displacement of a hand of the operator, for instance a displacement marking the intention of the operator to tap the defected cause in the defect menu 136.

Besides, the reporting unit is configured to provide the recorded statuses to the display management unit 34 and to the server 16. The reporting unit is configured to provide the recorded causes of defect to the server 16.

An assistance method 200 for assisting an operator in performing a quality control on the product 12, using the assistance system 10, will now be described, with reference to FIGS. 8 and 9.

This assistance method 200 comprises firstly a configuration step 210.

During this configuration step 210, the head-mounted display device 14 is brought close to the product 12 by the operator, so as to place an identification code 140 (FIG. 3) associated to the product 12, for instance placed on said product 12, in the field of view of the standard camera 56. As a result thereof, the code reader reads the identification code 140, and decodes it into an identifier which is provided to the configuration unit, during a first substep 212. Then, during a second substep 214, the configuration unit retrieves in the memory 64 of the server 16, using the identifier decoded by the code reader, the virtual mockup, the initial relative positioning information, and the list of subtasks which are, in said memory 64, associated to said identifier, and provides the virtual mockup to the display management unit 34, together with the list of subtasks, the initial relative positioning information, and, for each subtask of the list, a part information, an action information and, optionally, at least one of a picture and an animation corresponding to said subtask The step 210 is followed by an initialization step 220.

This initialization step 220 comprises a first substep 222 of equipping the support 18 on the product 12, followed by a second substep 224 of placing the head-mounted display device 14 in the slot 74 of the support 18, and then by a third substep 226 of informing the head-mounted display device 14 that this placement has been done, for instance by the operator pushing a button on the head-mounted display device 14 or performing a predetermined gesture in the field of view of one of the cameras 50, 52, 56 of the head-mounted display device 14. As a result thereof, the displacement tracking unit 36 sets the current estimation of the position and of the orientation of the head-mounted display device 14 in real-world space as the reference position and the reference orientation during a fourth substep 228, and starts tracking displacement of the head-mounted display device 14 relatively to these reference position and orientation.

The initialization step 220 is followed by a step 230 of wearing the head-mounted display device 14, during which the operator mounts the head-mounted display device 14 upon his head. This wearing step is followed, optionally, by a calibration step 240, during which the interpapillary distance of the operator is recorded by the display management unit 34 so as to adapt the images displayed by the display management unit 34 to said interpapillary distance.

Further to the wearing step 230 and, where appropriate, to the calibration step 240, the method 200 comprises an assistance step 250 during which the system 10 assists the operator in accomplishing a subtask of the task, for which the operator has to perform an action on a monitored part of the product 12.

At the first instance of this assistance step 250, this subtask consists of the first subtask mentioned in the list retrieved by the configuration unit.

Here, at the beginning of the first instance of this step 250, the operator is at a distance of the monitored part above the threshold distance and looks at the product 12, so that the operator views a first view of a scene including the product 12. He is however placed in such a position that he has no direct view on the monitored part. The corresponding first view of the scene in shown in FIG. 3.

This assistance step 250 comprises a first substep 251 of displaying general assistance images. This substep 251 comprises the display, by the display management unit 34, of the task advancement image 116, superimposed on the view of the scene, as a carrousel above the product 12.

The assistance step 250 also comprises a second substep 252, substantially simultaneous with the first substep 251, of displaying relevant assistance images for the execution of the subtask. During this second substep 252, the display management unit 34 displays the guidance images 104 and 106 to guide the operator toward a position in which he will have a direct view on the monitored part. The display management unit 34 also displays the highlighting images 100, 102, the action image 108, the validation mark 112 and the defect mark 114 superimposed on the view of the scene. Alternatively, the images 100, 102, 108 and the marks 112 and 114 are displayed only once the operator has a direct view on the monitored part.

During this second substep 252, the display management unit 34 deduces from the initial relative positioning information, and from the displacement tracked by the displacement tracking unit 36 since the initialization step 220, estimated current relative position and orientation of the product 12 relatively to the view source, and adjusts the images 100, . . . , 108, 112, 114 to said estimated current relative position and orientation.

Following the first and second substeps 251, 252 is a displacement substep 253 during which the operator moves toward the area highlighted by the square 104 until he gets a second view of the scene in which he has a direct view on the monitored part. This second view is shown in FIG. 4.

During this displacement substep 253, the display management unit 34 updates the calculation of the estimated position and orientation at the predetermined frequency, and refreshes the display of the images 100, . . . , 108, 112, 114 at the same frequency so as to continuously adjust said images 100, . . . , 108, 112, 114 to said estimated relative position and orientation. Once the operator has reached a position in which he has a direct view on the monitored part, the display management unit 34 refreshes the display of the images 100, . . . , 108, 112, 114 so as to remove the guidance images 104, 106.

Following the substep 253 is a step 254 of the operator requesting display of additional information, such as a plan of the product 12, followed by a step 255 of the display management unit 34 displaying in a frame 110 an image providing said additional information.

Then, the operator approaches the monitored part during a substep 256, until a position in which the eyes of the operator are at a distance from the monitored part under the threshold distance, and the operator views a third view of the scene which is shown in FIG. 5.

During this substep 256, the distance of the view source from the monitored part crosses the threshold distance. As a consequence thereof, the display of the task advancement image 116 is changed from the carrousel shape to the shape shown in FIG. 5, in which it is displayed as a succession of icons adjacent to the ring 100.

Also, during this substep, the display management unit 34 keeps updating the calculation of the estimated position and orientation, and refreshing the display of the images 100, . . . , 108, 112, 114.

Next, during a substep 257, the operator performs the action shown in the shield 108. If the operation involves manipulating the monitored part, the operator merely needs to try grabbing the virtual representation 102 thereof, his hands then naturally falling on the monitored part.

Following step 250, the method 200 comprises a step 260 of reporting the results of the control performed on the monitored part.

This step 260 comprises a first substep 261, during which the operator provides the reporting unit with either a validation instruction or a defect instruction, followed by a substep 262 of the reporting unit updating correspondingly the status of the subtask into a validated status or a defective status.

If the updated status is a defective status, the substep 262 is followed by a substep 263 of the operator providing, a cause of the defect to the reporting unit, followed itself by a substep 264 of recording this cause of defect, further followed by a transmission substep 265. If the reported instruction is a validation instruction, the substep 262 is followed directly by the transmission substep 265.

During the transmission substep 265, the status of the subtask is transmitted by the reporting unit to the server 16 and to the display management unit 34. In case the transmitted status is a defective status, transmission to the server 16 is accompanied with the transmission of the defect cause.

Transmission substep 265 is followed by a substep 266 of the display management unit 34 updating the task advancement image 116 in line with the transmitted status.

Step 260 is followed by a step 270 of checking if the executed subtask was the last task of the list or not. If it is the case, the method ends 200, and the head-mounted display device 14 is placed in an awaiting step. If the executed subtask was not the last task of the list, then steps 250, 260 and 270 are repeated with the following subtask mentioned in the list. It should be noted that, when step 250 is repeated, the operator may now be placed in a position in which he has direct view on the monitored step, in which case the second substep 252 would not comprise display of the guidance images 104 and 106.

Thanks to the invention described above, the operator is able to focus on the right quality controls depending to the variant he has to control. Furthermore, since the operator is guided from subtask to the following subtask, he cannot miss a control. As a result thereof, the risk of errors is significantly reduced.

Furthermore, the operator is able to perform his controls free-handed: the quality control is therefore facilitated.

Moreover, as the control channel is fully digitalized from end to end, the costs and activities related to paper printing in sequence are removed, and it becomes possible to use real time quality key performance indicators that will enable to react quickly to fix the recurrent errors which may appear in the assembly line.

It should be noted that, even though the example above is provided for the specific case in which the front-end display device 14 consists of a head-up display device, the invention is not limited to this case. As an alternative (not shown), the front-end display device 14 consists of a tablet, such as a tablet implementing the Google® Tango® technology, the view source the being a camera of the tablet and the view of the scene then being the view captured by the camera and reproduced on a screen of the tablet.

It should also be noted that alternatives are also available for the initialization step 220. Instead of the partly automatized step described above, the step 220 may consist of a fully manual step, comprising the following substeps:

display, by the display management unit 34, of an image of the entire virtual mockup of the product 12, displacement of the operator in the scene, until he reaches a position and an orientation in which the image of the virtual mockup matches the product 12, or command, by the operator, of displacement of the image of the virtual mockup the his view of the scene, until the image of the virtual mockup reaches a position in which it matches the product 12, and validation, by the user, that a correct positioning of the virtual mockup in the scene has been reached.

The invention claimed is:

1. An assistance method for assisting an operator in performing a task on a product, the method comprising a step of displaying, superimposed on a view of a scene including a monitored part of the product on which a subtask of the task has to be performed, at least one assistance image intended to assist the operator in performing this subtask, characterized in that said at least one assistance image includes at least one highlighting image highlighting the monitored part, wherein the view of the scene is provided by a view source, and the method further comprises the following steps:

tracking a displacement of the view source from a first viewing position in the scene, in which the product occupies a first relative position with a first relative orientation relatively to the view source, toward a second viewing position in which the product occupies a second relative position with a second relative orientation relatively to the view source, calculating an estimation of the second relative position and of the second relative orientation from the first relative position and orientation and from the tracked displacement, and refreshing the display of the at least one assistance image so as to adjust said at least one assistance image to the estimation of the second relative position and orientation, wherein the first viewing position consists of an initial viewing position in which the first relative position and orientation consist of predetermined relative position and orientation known by a display management unit in charge of displaying the at least one assistance image, wherein the method further comprises a step of equipping the product with a support comprising a slot able for receiving the view source and adapted so that, when the support is equipped on the product and the view source is received in said slot, the view source is placed in said initial viewing position, followed by a step of placing the view source in the slot of said support.

2. The assistance method of claim 1, wherein the at least one highlighting image comprises a ring surrounding the monitored part and preferably centered on said monitored part, and/or a virtual representation of said monitored part, said virtual representation being positioned so as to match the monitored part in the view of the scene.

3. The assistance method of claim 1, wherein the at least one assistance image is displayed on at least one display surface.

4. The assistance method of claim 3, wherein the view of the scene consists of a view of the scene through the at least one display surface.

5. The assistance method of claim 3, wherein the at least one display surface is part of a head-mounted display device, said head-mounted display device being adapted to be worn by the operator in such a manner that the display surface faces a respective one of his eyes.

6. The assistance method of claim 5, wherein the at least one display surface includes a primary display surface and a secondary display surface, the at least one assistance image consisting of a stereoscopic image including a primary image displayed on the primary display surface and a secondary image displayed on the secondary display surface, said primary and secondary images consisting of images of a same element viewed from slightly different angles.

7. The assistance method of claim 5, wherein the view source comprises the position intended to be occupied by at least one of the eyes of the operator wearing the head-mounted display device.

8. The assistance method of claim 1, wherein the at least one assistance image comprises at least one guidance image highlighting an area where to place the view source so as to provide a better view on the monitored part.

9. The assistance method of claim 1, comprising a step of displacing the view source in the scene in manner that the distance of the view source from the monitored part crosses a threshold distance, followed by a step of modifying the position of at least part of the at least one assistance image.

10. The assistance method of claim 1, wherein the task to be performed comprises a quality control of the product.

11. The assistance method of claim 1, wherein the product comprises a part of an automotive vehicle.

12. The assistance method of claim 1, comprising, prior to displaying the at least one assistance image, a step followed by a step of, using said identification code, automatically retrieving a list of at least one subtask to be performed on the product, the at least one assistance image being intended to assist the operator in performing a subtask of said list.

13. An assistance system for assisting an operator in performing a task on a product, the assistance system comprising a display management unit configured for displaying, superimposed on a view of a scene including a monitored part of the product on which a subtask of the task has to be performed, at least one assistance image intended to assist the operator in performing this subtask, characterized in that said at least one assistance image includes at least one highlighting image highlighting the monitored part, wherein the assistance system includes a view source, at least one sensor to track a displacement of the view source from a first viewing position in the scene, in which the product occupies a first relative position and a first relative orientation relatively to the view source, toward a second viewing position in which the product occupies a second relative position and a second orientation relatively to the view source, and the display management unit is configured to calculate an estimation of the second relative position and orientation from the first relative position and orientation and from the tracked displacement, and to refresh the display of the at least one assistance image so as to adjust said at least one assistance image to the estimation of the second relative position and orientation, wherein the first viewing position consists of an initial viewing position in which the first relative position and orientation consist of predetermined relative position and orientation known by the display management unit, the system further comprising a support able to be mounted on the product and including a slot able for receiving the view source, said support being adapted so that, when it is mounted on the product and the view source is received in said slot, the view source is placed in the initial viewing position.

14. The assistance system of claim 13, wherein the at least one highlighting image comprises a ring surrounding the monitored part and preferably centered on said monitored part, and/or a virtual representation of said monitored part, said virtual representation being positioned so as to match the monitored part in the view of the scene.

15. The assistance system of claim 13, comprising at least one display surface, the display management unit being configured to display the at least one assistance image on said at least one display surface.

16. The assistance system of claim 15, wherein the view of the scene consists of a view of the scene through the at least one display surface.

17. The assistance system of claim 14, comprising a head-mounted display device which includes the at least one display surface, said head-mounted display device being adapted to be worn by the operator in such a manner that the display surface faces a respective one of his eyes.

18. The assistance system of claim 17, wherein the at least one display surface comprises a primary display surface and a secondary display surface, and the display management unit is configured for displaying a primary image on the primary display surface and a secondary image on the secondary display surface, said primary and secondary images consisting of images of a same element viewed from slightly different angles, so as to form the at least one assistance image as a stereoscopic image resulting from the combination, by the eyes of the operator, of the primary and secondary images.

19. The assistance system claim 13, wherein the view source comprises the position intended to be occupied by at least one of the eyes of the operator wearing the head-mounted display device.

20. The assistance system of claim 13, wherein the at least one assistance image comprises at least one guidance image highlighting an area where to place the view source so as to provide a better view on the monitored part.

21. The assistance system of claim 13, wherein the display management unit is configured for modifying the position of at least part of the at least one assistance image when the distance of the view source from the monitored part crosses a threshold distance.

22. The assistance system of claim 13, wherein the task to be performed comprises a quality control of the product.

23. The assistance system of claim 13, wherein the product comprises a part of an automotive vehicle.

24. The assistance system of claim 13, comprising a memory storing a virtual mockup of the product.

25. The assistance system of claim 13, comprising a memory storing a first of at least one subtask to be performed, a reader able to read an identification code worn by the product, and a configuration unit configured to retrieve said list in the memory, using the identification code read by the reader, and the display management unit being configured to display the at least one assistance image depending on the relevant list retrieved from the memory.

* * * * *